US006823511B1

(12) United States Patent
McKenney et al.

(10) Patent No.: US 6,823,511 B1
(45) Date of Patent: Nov. 23, 2004

(54) READER-WRITER LOCK FOR MULTIPROCESSOR SYSTEMS

(75) Inventors: Paul E. McKenney, Beaverton, OR (US); Brent Kingsbury, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,082

(22) Filed: Jan. 10, 2000

(51) Int. Cl.[7] .......................... G06F 9/46; G06F 12/00
(52) U.S. Cl. ...................... 718/102; 718/100; 718/104; 718/106; 710/200; 711/147; 711/150
(58) Field of Search .............................. 709/100, 102, 709/104, 106, 107, 312; 710/200–244; 711/147, 148, 150, 152

(56) References Cited

U.S. PATENT DOCUMENTS

| 3,683,418 | A | * | 8/1972 | Martin | 711/152 |
| 4,435,766 | A | * | 3/1984 | Haber et al. | 710/200 |
| 5,361,369 | A | * | 11/1994 | Kametani | 709/106 |
| 5,968,157 | A | * | 10/1999 | Joy et al. | 710/200 |
| 5,983,329 | A | * | 11/1999 | Thaler et al. | 711/163 |
| 6,026,427 | A | * | 2/2000 | Nishihara et al. | 709/106 |
| 6,032,216 | A | * | 2/2000 | Schmuck et al. | 710/200 |
| 6,182,199 | B1 | * | 1/2001 | Faust | 711/163 |
| 6,477,597 | B1 | * | 11/2002 | Sorace et al. | 710/200 |
| 6,480,918 | B1 | * | 11/2002 | McKenney et al. | 710/200 |
| 6,493,804 | B1 | * | 12/2002 | Soltis et al. | 711/152 |

OTHER PUBLICATIONS

Desai & Mueller, "A Brief Overview of Scalable Distributed Concurrency Services for Hierarchical Locking", JGI '02, Nov. 3–5, 2002.□□.*
Wisnieski et al., "Scalable Spin Locks for Multiprogrammed Systems," *8th IEEE International Parallel Processing Symposium* (Apr. 1994).
Craig, "Building FIFO and Priority–Queuing Spin Locks from Atomic Swap," *University of Washington Technical Report 93–02–02* (Feb. 1, 1993).
Lim et al., "Reactive Synchronization Algorithms for Multiprocessors," *ASPLOS VI*, San Jose, California (Oct. 1994).
Magnusson et al., "Efficient Software Synchronization on Large Cache Coherent Multiprocessors," *Swedish Institute of Computer Science Research Report T94:07* (Feb. 18, 1994).
Hsieh & Weihl, "Scalable Reader–Writer Locks for Parallel Systems," *Tech Report MIT/LCS/TR–521*, (Nov., 1991).
Mellor–Crummey & Scott, "Scalable Reader–Writer Synchronization for Shared–Memory Multiprocessors," *Proceedings of the Third ACM SIGPLAN Symposium on Principles and Practices of Parallel Programming*, pp. 106–113 (Apr., 1991).
Lim et al., "Waiting Algorithms for Synchronization in Large–Scale Multiprocessors," *Transactions on Computer Systems*, pp. 253–294 (Aug., 1993).
Snaman and Thiel, "The VAX/VMS Distributed Lock Manager," *Digital Technical Journal*, pp. 29–44 (Sep., 1987).

* cited by examiner

*Primary Examiner*—Meng-Al T. An
*Assistant Examiner*—Ali Syed
(74) *Attorney, Agent, or Firm*—Lieberman & Brandsdorfer, LLC (57) ABSTRACT

A reader-writer lock minimizes writer and reader overhead by employing lock structures that are shared among groups of processors that have lower latencies. In the illustrated multiprocessor system having a non-uniform memory access (NUMA) architecture, each processor node has a lock structure comprised of a shared counter and associated flag for each CPU group. During a read, the counter can be changed only by processors within a CPU group performing a read. This reduces the reader overhead that otherwise would exist if all processors in the system shared a single counter. During a write, the shared flag can be changed by a process running on any processor in the system. The processors in a CPU group are notified of the write through the shared flag. This reduces the writer overhead that otherwise would exist if each processor in the system had a separate flag. The number of CPUs per group can be varied to optimize performance of the lock in different multiprocessor systems.

23 Claims, 6 Drawing Sheets

READER-WRITER LOCK FOR MULTIPROCESSOR SYSTEMS

TECHNICAL FIELD

This invention relates generally to process synchronization in multiprocessor systems. More particularly, this invention relates to a reader-writer lock and related method for multiprocessor systems having a group of processors (CPUs) with lower communication latencies than other processors in a system. Such systems include but are not limited to multiprocessor systems having a non-uniform memory access (NUMA) architecture.

BACKGROUND

Multiprocessor systems by definition contain multiple processors (also referred to herein as CPUs) that can execute multiple processes (or multiple threads within a single process) simultaneously, in a manner known as parallel computing. In general, multiprocessor systems execute multiple processes or threads faster than conventional uniprocessor systems, such as personal computers (PCs), that execute programs sequentially. The actual performance advantage is a function of a number of factors, including the degree to which parts of a multithreaded process and/or multiple distinct processes can be executed in parallel and the architecture of the particular multiprocessor system at hand. The degree to which processes can be executed in parallel depends, in part, on the extent to which they compete for exclusive access to shared memory resources.

Shared memory multiprocessor systems offer a common physical memory address space that all processors can access. Multiple processes therein (or multiple threads within a process) can communicate through shared variables in memory which allow the processes to read or write to the same memory location in the computer system. Message passing multiprocessor systems, in contrast to shared memory systems, have a separate memory space for each processor. They require processes to communicate through explicit messages to each other.

The architecture of shared memory multiprocessor systems may be classified by how their memory is physically organized. In distributed shared memory (DSM) machines, the memory is divided into modules physically placed near one or more processors, typically on a processor node. Although all of the memory modules are globally accessible, a processor can access local memory on its node faster than remote memory on other nodes. Because the memory access time differs based on memory location, such systems are also called non-uniform memory access (NUMA) machines. In centralized shared memory machines, on the other hand, the memory is physically in one location. Centralized shared memory computers are called uniform memory access (UMA) machines because the memory is equidistant in time from each of the processors. Both forms of memory organization typically use high-speed cache in conjunction with main memory to reduce execution time.

The use of NUMA architecture to increase performance is not restricted to NUMA machines. A subset of processors in an UMA machine may share a cache. In such an arrangement, even though the memory is equidistant from all processors, data can circulate among the cache-sharing processors faster (i.e., with lower latency) than among the other processors in the machine. Algorithms that enhance the performance of NUMA machines can thus be applied to any multiprocessor system that has a subset of processors with lower latencies. These include not only the noted NUMA and shared-cache machines, but also machines where multiple processors share a set of bus-interface logic as well as machines with interconnects that "fan out" (typically in hierarchical fashion) to the processors.

A significant issue in the design of multiprocessor systems is process synchronization. As noted earlier, the degree to which processes can be executed in parallel depends in part on the extent to which they compete for exclusive access to shared memory resources. For example, if two processes A and B are executing in parallel, process B might have to wait for process A to write a value to a buffer before process B can access it. Otherwise, a race condition could occur, where process B might access the buffer before process A had a chance to write the value to the buffer.

To illustrate further, suppose two processors execute processes having instructions to add one to a counter. Specifically, the instructions could be the following:

1. Read the counter into a register.
2. Add one to the register.
3. Write the register to the counter.

If the two processors were to execute these instructions in parallel, the first processor might read the counter (e.g., "5") and add one to it (resulting in "6"). Since the second processor is executing in parallel with the first processor, the second processor might also read the counter (still "5") and add one to it (resulting in "6"). One of the processors would then write its register (containing a "6") to the counter, and the other processor would do the same. Although two processors have executed instructions to add one to the counter, the counter is only one greater than its original value.

To avoid this incorrect result, process synchronization mechanisms are provided to control the order of process execution. These mechanisms include mutual exclusion locks (mutex locks), condition variables, counting semaphores, and reader-writer locks. A mutual exclusion lock allows only the processor holding the lock to execute an associated action. When a processor requests a mutual exclusion lock, it is granted to that processor exclusively. Other processors desiring the lock must wait until the processor with the lock releases it. To solve the add-one-to-a-counter scenario described above, for example, both the first and the second processors would request the mutual exclusion lock before executing further. Whichever processor first acquires the lock then reads the counter, increments the register, and writes to the counter before releasing the lock. The other processor must wait until the first processor finishes and releases the lock; it then acquires the lock, performs its operations on the counter, and releases the lock. In this way, the lock guarantees the counter is incremented twice if the instructions are run twice, even if processors running in parallel execute them.

For processes to be synchronized, instructions requiring exclusive access can be grouped into a critical section and associated with a lock. When a process is executing instructions in its critical section, a mutual exclusion lock guarantees no other processes are executing the same instructions. This is important where processes are attempting to change data (as described in the example above). Such a lock has the drawback, however, in that it prohibits multiple processes from simultaneously executing instructions that only allow the processes to read data. A reader-writer lock, in contrast, allows multiple reading processes ("readers") to access simultaneously a shared resource such as a database, while a writing process ("writer") must have exclusive access to the database before performing any updates for consistency. A practical example of a situation appropriate for a reader-writer lock is a TCP/IP routing structure with many readers and an occasional update of the information. Early implementations of reader-writer locks are described by Courtois, et al., in "Concurrent Control with 'Readers' and 'Writers'," Communications of the ACM, 14(10):667–668 (1971). More recent implementations are described by Mellor-Crummey and Scott (MCS) in "Scalable Reader-Writer Synchronization for Shared-Memory Multiprocessors," Proceedings of the Third ACM SIGPLAN Symposium on Principles and Practices of Parallel Programming, pages 106–113 (1991) and by Hseih and Weihl in "Scalable Reader-Writer Locks for Parallel Systems," Technical Report MIT/LCS/TR-521 (November 1991).

The basic mechanics and structure of reader-writer locks are well known. In a typical lock, multiple readers may acquire the lock, but only if there are no active writers. Conversely, a writer may acquire the lock only if there are no active readers or another writer. When a reader releases the lock, it takes no action unless it is the last active reader; if so, it wakes up the next waiting writer. When a writer releases the lock, it wakes up another writer or all of the waiting readers. A reader-writer lock is typically implemented through the use of a semaphore that indicates whether the shared resource may be accessed. A semaphore is an integer-valued object that supports two atomic operations, P( ) and V( ). A P( ) operation decrements the value of the semaphore and acquires the lock. A V( ) operation increments a value and releases the lock. By reading the semaphore value, a processor can tell whether the associated shared resource is available or is in use.

A drawback of prior reader-writer locks is undesired "spinning on the lock," whereby each processor wishing to use a shared resource continually polls the lock to determine if it is available. When multiple processors spin on a lock, they degrade system performance by contending for the lock and generating excessive traffic over buses and system interconnects. This is known as overhead. The drawback has been partially addressed in more recent locking schemes such as the ones described by Hseih and Weihl. Their static locking algorithm allocates one semaphore per processor, stored in memory local to the processor. An additional semaphore acts as a gate on the writers. To acquire a static lock, a reader need only acquire its local semaphore, greatly reducing the amount of local spinning. A writer, however, must still acquire all of the semaphores, of which there is now one for each processor, and the additional semaphore. When releasing a static lock, a reader simply releases its local semaphore; a writer releases all of the semaphores. The lock thus offers an improvement over prior locks in that the readers do not interfere with each other and readers do not have to go over the system interconnect to acquire a lock. However, the fact that readers never interfere means that writers must do a substantial amount of work in systems with many processors. When even a few percent of the requests are writes, the throughput suffers dramatically because a writer must acquire a semaphore for every processor on every node to successfully acquire the lock. To overcome this problem, their dynamic locking scheme attempts to reduce the number of semaphores a writer must acquire by keeping track of active readers in a single memory location and acquiring only semaphores associated with these readers. The scheme uses a variety of mutex locks and queues to accomplish this. The cost, however, is increased contention and system traffic by readers.

An objective of the invention, therefore, is to provide a reader-writer lock and method for a multiprocessor system which reduces writer overhead without unduly increasing reader overhead.

SUMMARY

In one aspect of the invention, a reader-writer lock for a multiprocessor system includes a first counter shared by a first group of two or more processors, the counter adapted to indicate whether a process running on a processor in the first processor group has read-acquired the lock. A first flag is associated with the first counter, the flag adapted to indicate whether any process has write-acquired the lock. A second counter is shared by a second group of one or more processors, the second counter adapted to indicate whether a process running on a processor in the second processor group has read-acquired the lock. A second flag is associated with the second counter, the second flag adapted to indicate whether any process has write-acquired the lock.

In a second aspect of the invention, the multiprocessor system includes a number of interconnected processor nodes. A first node includes the first processor group and local memory storing the first counter and first flag. A second node includes the second processor group and local memory storing the second counter and the second flag.

In another aspect of the invention, the lock includes an indicator adapted to indicate to a first writing process before it releases the lock that a second writing process desires to acquire the lock, thereby avoiding a need to clear the flag to indicate that the first writing process has released the lock. The lock also includes an indicator adapted to indicate to a second writing process before it acquires the lock that a first writing process has most recently held the lock, thereby avoiding a need to set the flag to indicate that the second writing process has write-acquired the lock.

These and other aspects of the invention are described in the following description of an illustrative embodiment and shown in the accompanying drawings.

DETAILED DESCRIPTION OF AN ILLUSTRATIVE EMBODIMENT

The invention has been implemented within a multiprocessor system such as the one shown and described herein. It should be readily recognized from this disclosure, however, that the invention is not limited to this implementation but can be applied in any suitable computer system having multiple nodes, wherein communications latencies between processors within a node are lower than the communications latencies between processors in different nodes.

Although the illustrated embodiment portrays the invention implemented in a NUMA machine in which each node has local memory, the invention can be applied to other multiprocessor systems. Any system design wherein processors are grouped so that certain processors have significantly lower communications latencies than others (e.g., an UMA machine in which processors are grouped to share a cache) can benefit from the described locking scheme. The term "node" herein thus includes any such grouping of processors. The term "process" herein is meant to apply as well to threads, tasks, light-weight processes, jobs, and equivalent substitutes.

System Overview

Figure 1:
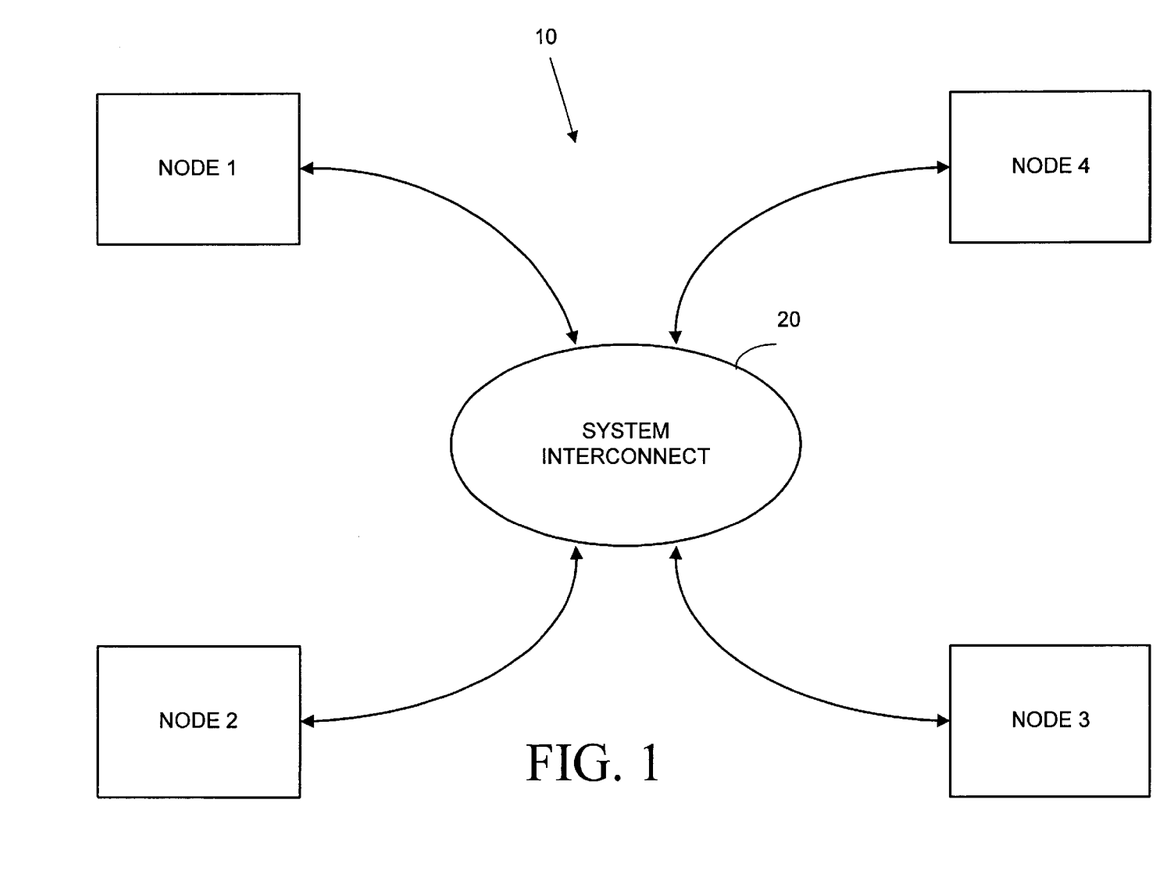
FIG. 1 is a diagram of a multiprocessor system having multiple interconnected processor nodes.

FIG. 1 is a block diagram of a multiprocessor system 10 that uses a computer architecture based on distributed shared memory (DSM). This type of computer system is also known as a NUMA machine. Four nodes 1–4 are shown connected by a system interconnect 20 (i.e., a network) that permits any node to communicate with any other node. The purpose of system interconnect 20 is to allow processors in any node to directly and transparently access the physical memory that resides in any other node. System interconnect 20 is a switch-based network that in the illustrative embodiment uses the Scalable Coherent Interface (SCI) interconnection mechanism. SCI is an IEEE-approved standard that is well documented in a number of publications including IEEE Std 1596-1992 (1993) and Multiprocessor Interconnection Using SCI, a Master Thesis by Ivan Tving, DTH ID-E 579 (1994). A multiprocessor system using the SCI mechanism is shown and described in U.S. Pat. No. 5,802,578.

The physical links of interconnect 20 provide high bandwidth and low latency and are scalable to allow for the addition of more nodes. Links that meet these requirements presently include point-to-point interconnects with a data throughput of one gigabyte/second or greater. The links can be configured in any number of ways for connecting the nodes 1–4, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, Computer Sciences Technical Report # 1058, University of Wisconsin—Madison.

Figure 2:
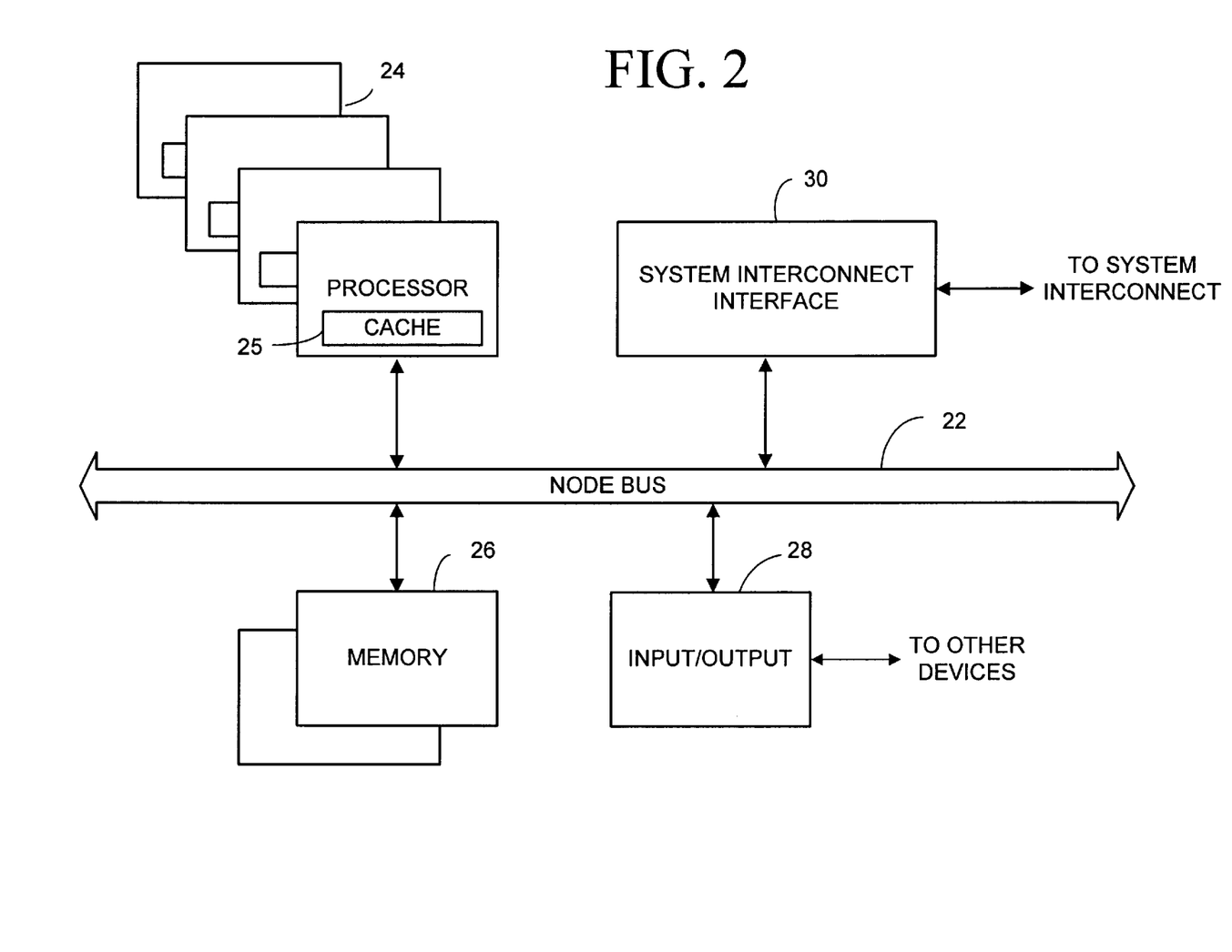
FIG. 2 is a diagram of one of the nodes of the multiprocessor system of FIG. 1.

A block diagram of a node on system 10 is shown in FIG. 2. The node includes a symmetric multiprocessor (SMP) node bus 22 for connecting multiple data processors 24 to a local memory 26 (a computer-readable medium). For clarity, nodes 1–4 may also be referred to as home nodes or remote nodes. A home node is one whose local memory stores a memory block of interest (i.e., the physical address of the memory block falls within the address range supported by the local memory or cache); all of the other nodes are then remote nodes with respect to that memory block. Additionally, a node may be a requesting node or a responding node. A requesting node is one requesting data; a responding node is one furnishing requested data.

An input/output (I/O) device 28, which is also connected to bus 22, connects the node to devices outside computer system 10 for communicating information between the computer system and the outside world. I/O device 28 may be of conventional design and includes means for connecting the node (and system 10) to personal computers, local area networks, etc., that wish to communicate with the computer system 10. The I/O device 28 may also allow for connection to peripheral devices, such as floppy disks, hard disks, CD-ROMs, etc., and other computer-readable media.

To connect a node to the other nodes in the system, the node includes a system interconnect interface 30. The system interconnect interface forms part of interconnect 20 along with the physical links between nodes and the interface devices on the other nodes of the computer system 10. In the illustrative embodiment, interface 30 is constructed to implement the SCI standard for data communication between the nodes, allowing a processor on one node to transparently access memory physically located on another node. The interface 30 also contains a remote cache for caching data received from other nodes.

The nodes of system 10 each contain a number of processors or CPUs 24, each of which supports multiple interrupt levels. Each processor has at least one processor cache 25 that caches data for the processor according to the processor's caching scheme. The CPUs within a node may be further organized into CPU groups, as described below.

CPU Groups

Figure 3A:
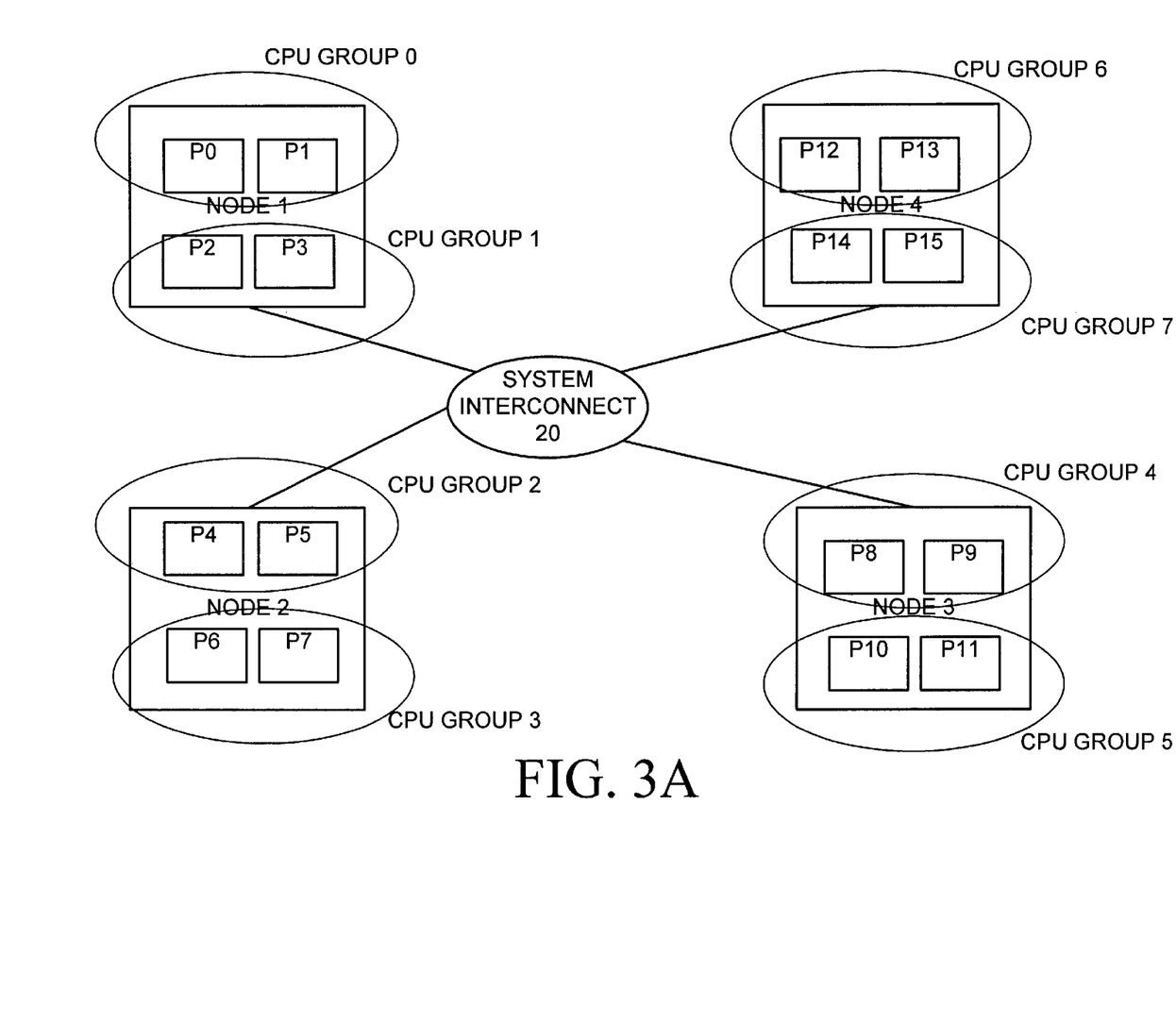
FIG. 3A is a diagram showing the processors in the system of FIG. 1 organized into CPU groups.
Figure 3B:
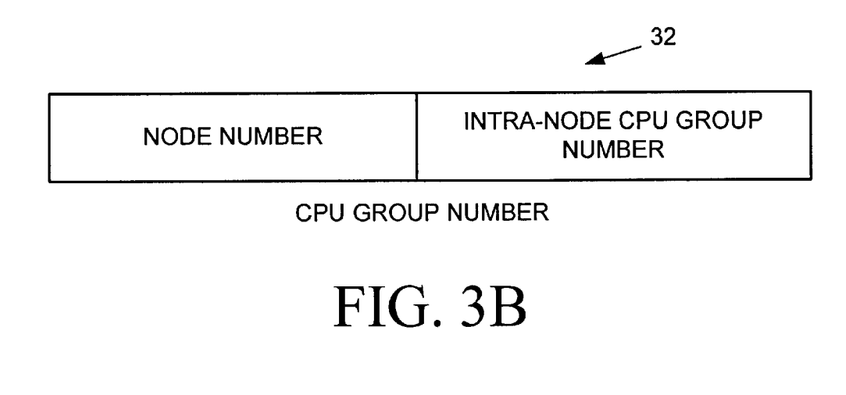
FIG. 3B is a diagram showing a data structure that stores a CPU group number.

FIG. 3A is a block diagram of system 10 with the processors of nodes 1–4 shown grouped into CPU groups. Processors 0 and 1 on node 1, for example, are grouped into CPU group 0. In the illustrative embodiment, there are two CPU groups per node, with two CPUs per group. Referring to FIG. 3B, each CPU group number is contained in a data structure 32 stored in system memory. It includes a node number in higher-order bits and an intra-node CPU group number in lower-order bits. The CPU group number serves as an identifier adapted to indicate the processor group that contains the processor on which a process was running at the time the process acquired the lock.

In the illustrated embodiment, the number of CPUs per group is set by a system command in response to the number of CPUs in the computer system 10 and the number of CPUs per node. If the total number of CPUs is 16 or fewer and there are four processors per node, the groups preferably each contain one CPU. This, however can be changed as desired (as in the embodiment). If the number of CPUs is 32 or fewer but greater than 16, the groups each contain two CPUs. If the number if CPUs is greater than 32, the groups each contain four CPUs.

Figure 5:
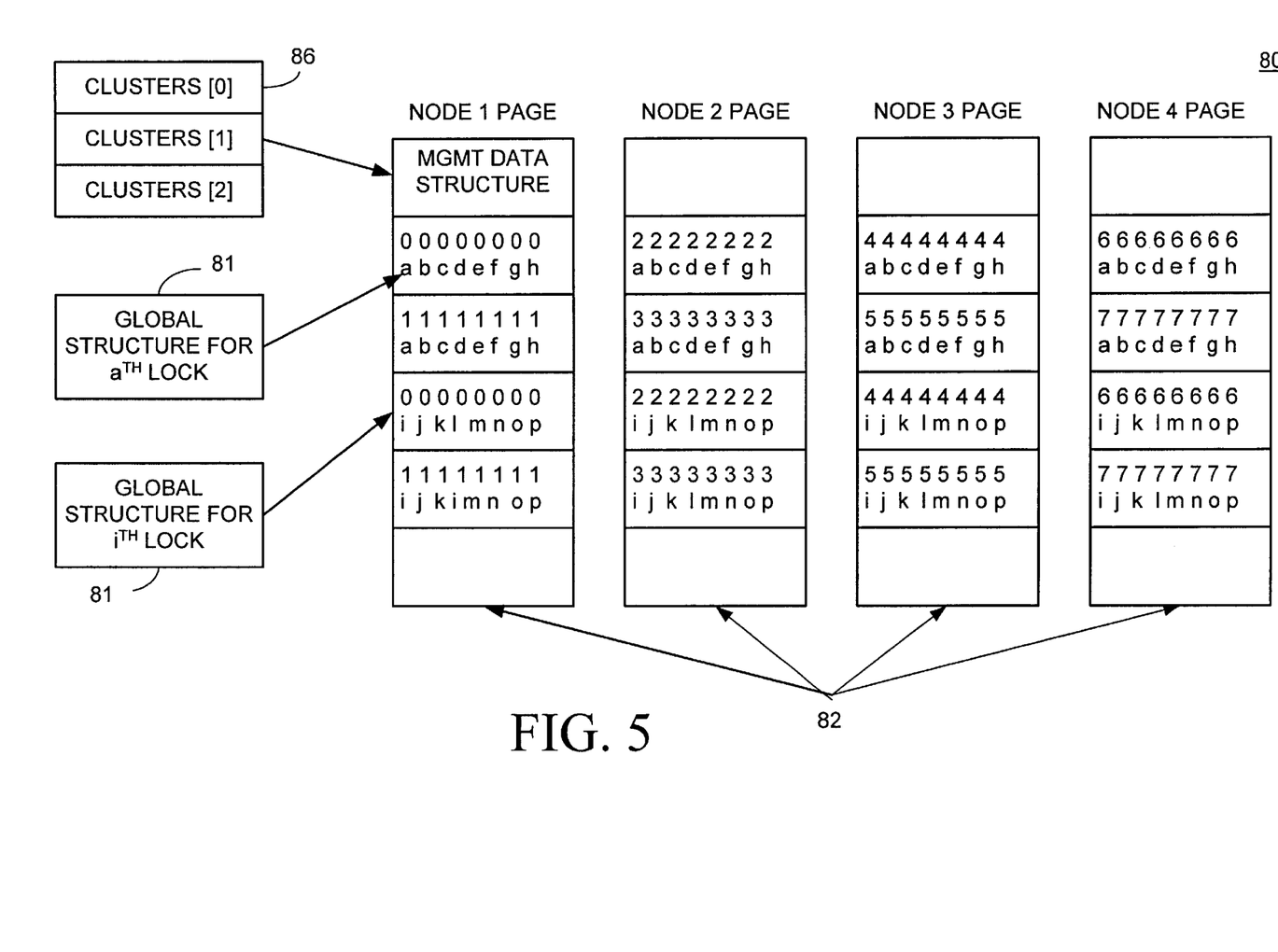
FIG. 5 is a diagram showing the structure of reader-writer locks in accordance with the invention.
Figure 6:
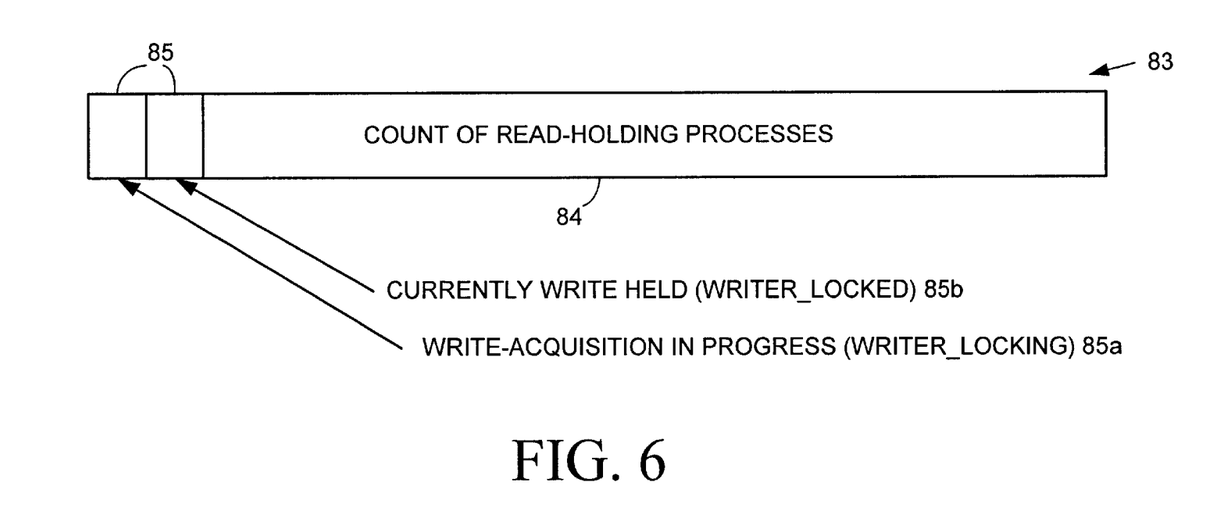
FIG. 6 is a diagram of a lock data structure having a counter an associated flag.

The number of CPUs per group is important because, as will be seen in FIGS. 5 and 6, each CPU group shares for each lock a lock structure comprised of a counter and associated flag. The lock structures for the multiple CPU groups form part of a single reader-writer lock in accordance with the invention. The larger the process read-to-write ratio, the greater the advantage of smaller CPU groups. When processes are performing reads, there is no need to notify other CPUs, and updating shared counters can be reduced or eliminated by reducing the number of CPUs per group to as few as one. The larger the number of CPUs in the system, the greater the advantage of larger CPU groups. Increasing the number of CPUs per group reduces the amount of work that a writing process must to do acquire the lock by reducing the number of associated flags that must be set.

Operating System And Lock Interaction

Figure 4:
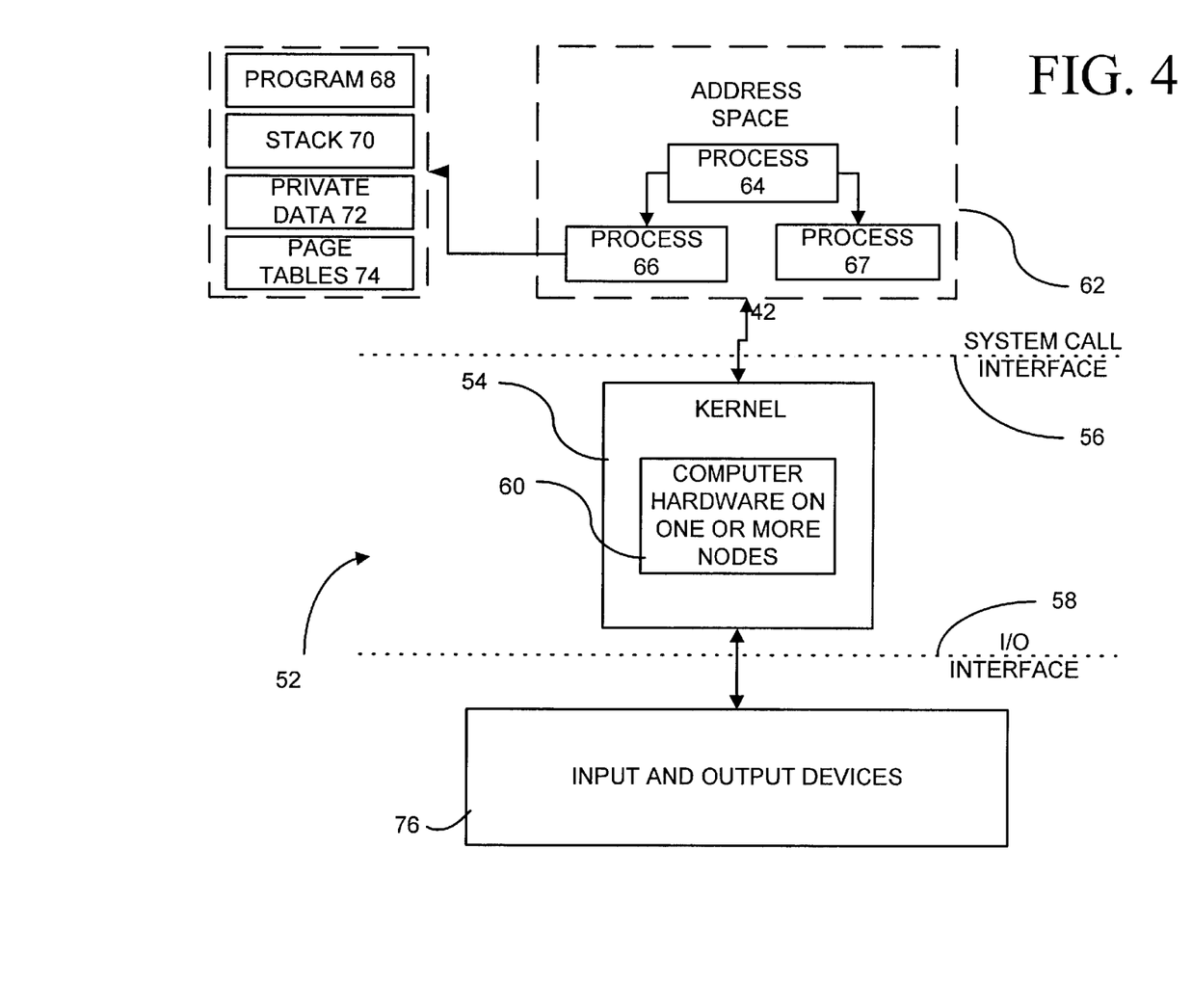
FIG. 4 is a diagram showing the interaction of an operating system for the system of FIG. 1 with multiple processes.

FIG. 4 shows an operating system 52 for computer system 10, which includes a kernel 54, a system call interface 56 and an I/O interface 58 to input/output devices 76. The illustrated operating system is a UNIX-based operating system, although other operating systems may be used. The kernel 54 is a program stored in local memory 26 on one or more nodes. Memory 26, processors 24, and other hardware of computer system 10 are used for running the kernel 54 and are shown generally as computer hardware 60. The kernel 54 is responsible for controlling the computer system's resources and scheduling user requests so that each user request receives a fair share of the system resources. A system resource can be, for example, a lock, an I/O device, a shared memory segment, a file, a process, a processor, etc.

In the course of applications executing on computer system 10, requests are generated by one or more processes, such as system process 64 and processes 66 and 67 that run in address space 62. A process such as 66 includes a part of a program 68 (i.e., instructions) and an execution environment for running the program. For example, it includes a stack 70, private data 72 for storing local variables, and page tables 74 used to define physical memory associated with the process. Although only system process 64 and the two processes 66, 67 are shown, any number of processes and processes may run on the node at one time.

Processes make requests to the kernel 54 through system calls which are passed to the kernel by the system call interface 56. These requests, which may occur in parallel if the processes are running on different processors, include reads or writes to shared objects in a database. To meet these requests, the kernel includes several functions, or primitives, that work with reader-writer locks constructed in accordance with the invention. Specifically, the primitives work with certain data structures, described below, that respond to lock requests, lock releases, and interrupts in an efficient way while synchronizing process access to shared resources. In the illustrated embodiment, the primitives permit processes to write-acquire and write-release a lock; exclusive-read-acquire and exclusive-read-release a lock; upgrade an exclusive-read-acquired lock to a write-acquired lock; and read-acquire and read-release a lock.

The Reader-Writer Lock Structures

FIG. 5 shows multiple reader-writer locks 80$a$–$p$ in accordance with the invention. Each lock 80 in the illustrated embodiment includes two parts: a global structure 81 and a set 82 of per-CPU group lock structures 83 (FIG. 6). The global structure 81 for each lock 80 contains semaphores, counters, and a pointer to the associated counter set 82. Its pertinent fields are shown in Table 1:

TABLE 1

| Field | Description |
|---|---|
| mutex | A spinlock that guards access to the writer_await and readers_await semaphores. It also is used to resolve races between reading and writing processes. |
| readers_queued | The number of processes queued waiting for exclusive-read access. |
| readers_writers_mutex | A semaphore that serializes access from writing and exclusive-reading processes. |
| readers_writers_active | The number of writing and exclusive reading processes that are currently holding the reader-writer lock (never more than one). Guarded by the readers_writers_mutex. |
| writer_await | A semaphore on which the current writer blocks waiting for preceding readers to release the rdr-wrtr lock. |
| reader_cpus_active | The number of CPU groups on which currently-active reading processes read-hold the reader-writer lock when a writing process is write-acquiring. |
| readers_await | A semaphore on which would-be reading processes wait for the current writing process to release the reader-writer lock. |
| readers | A pointer to the CPU group 0 lock structure for the reader-writer lock. |
| nenggrp | The number of a particular CPU group. |

Referring to FIG. 6, a per-CPU group lock structure 83 is shown. It includes a counter 84 and a flag 85. The counter 84 gives the number of reading processes holding the lock. The flag 85 comprises WRITER_LOCKING bit 85$a$, WRITER_LOCKED bit 85$b$. If bit 85$a$ is set, it indicates that a process is in the act of write-acquiring the lock, but that there are read-holding processes that presently have read-acquired the lock. If bit 85$b$ is set, it indicates that a process write-holds the reader-writer lock. In the illustrated embodiment of the invention, the lock structure (counter and associated flag) is encoded in a word, which means that a processor can operate on the lock structure in one operation.

Returning to FIG. 5, a structure set 82 for lock 80$a$ includes structures 83 labeled 0$a$ through 7$a$ across nodes 1–4. A structure set 82$i$ for lock 80$i$ includes structures 83 labeled 0$i$ through 7$i$ across these nodes. The lock structure 83 for a particular CPU group is stored in a page of local memory on the node occupied by the CPU group. In FIG. 5, for example, system 10 is configured with two CPU groups per node. Each group contains two CPUs (for a total of four CPUs per node). The node 1 local memory page contains, for CPU groups 0 and 1, structures 0$a$ and 1$a$ for lock 80$a$. Similarly, the node 2 local memory page contains, for CPU groups 2 and 3, structures 2$a$ and 3$a$ for lock 80$a$. The node 3 local memory page contains, for CPU groups 4 and 5, structures 4$a$ and 5$a$ for lock 80$a$. And the node 4 local memory page contains, for CPU groups 6 and 7, structures 6$a$ and 7$a$ for lock 80$a$.

Note in FIG. 5 the arrangement of the lock structures 83 in the memory page. The lock structures that are part of the same reader-writer lock but different CPU groups, such as structure 0$a$ and structure 1$a$, are stored in different lines of local memory 26 (i.e., blocks of memory that move the system as a single unit). This is done to prevent processors in different groups from contending for the same memory line. Note also that lock structures 83 for different reader-writer locks but the same CPU group (i.e., 0$a$, 0$b$, etc.) are stored (interleaved) in the same line of memory. This conserves memory resources without a significant performance cost because the same CPUs are sharing the cached line.

As shown in FIG. 5 and stated in Table 1, the global structure 81 for a particular lock 80 points to the lock structure 83 for CPU group 0. The other structures 83 for a particular lock 80 can be reached from the first lock structure through address arithmetic.

The number of CPUs per group (and thus per lock structure) can vary. As noted above, the group size may be initially determined from the number of CPUs in the system 10, and then allocated on the nodes in accordance with that determination. This allocation, however, may be dynamic and may be mixed; some nodes may have one number of CPUs per group and other nodes may have a different number of CPUs per group. Or the number of CPUs per group may be uniform but may change as the system 10 changes or as the desired number per group changes. To allow for this, another data structure (such as an array 86 shown in FIG. 5) may be provided whose elements point to different lock structure sets 82. The appropriate element pointer is selected from the array for the desired counter set. In the example of FIG. 5, the set 82 has two CPUs per group, or eight counters in a four-node system with four CPUs per node. Other counter sets may provide four CPUs per group (four counters total), one CPU per group (16 counters total), etc.

Operation of a Reader-Writer Lock

Each lock 80 is associated with a particular shared object. Upon initially attempting to acquire access to the shared object, a CPU within a group reads the structure 83 from local memory 26 into its local cache 25. The counter 84 and flag 85 are then updated among the CPUs in a group in accordance with the caching scheme for the CPUs. In the example of FIG. 5, CPUs 0 and 1 are in CPU group 0 and share structure 0*a* for lock 80*a*. If a process running on CPU 0 wishes to read the shared object guarded by lock 80*a*, it acquires the structure 0*a* from memory 26 and increments the value of counter 84 within structure 0*a*. If a process running on CPU 1 now desires to read the object, it acquires a copy of the structure 0*a* from the cache of CPU 0 and increments the counter again. If a process running on any CPU in system 10 wishes to write to a shared object guarded by lock 80*a*, it sets the flags 85 of lock structures 0*a*–7*a*. The number of flags that must be set, however, is reduced when there is more than one CPU per group because several CPUs then share a flag. To prevent race conditions, each lock 80 has a mutex (see Table 1) that prevents more than one CPU from performing a write-related operation.

In more detail, the operating system kernel 54 responds to a process request to access a shared object by calling one or more of the appropriate primitives, which are described in detail below. In doing so, the kernel passes to the called primitive a pointer to the lock. The process may also pass two other arguments. One is an integer representing the priority at which to block the process if the lock is not immediately available. The other is a termination flag that, if set, indicates that the primitive should test for process termination upon process wakeup. Otherwise, the reader-writer lock will be write-acquired even if the process has been killed in the meantime.

The selected primitive then executes. If the lock is unavailable, the requesting process blocks at the desired priority. If the lock is available, the termination flag is checked to see whether the process status should be checked. If so, the requesting process is checked for active status before examining the counters and acquiring the lock. If the process is not active, the lock request is aborted.

The following tables describe in pseudo-code how various primitives interact with the structures of a lock 80.

The p_common Primitive

The p_common primitive is called by primitives p_writer and u_exreader2writer to write-acquire a lock 80, thereby enabling a process to write to a shared object protected by the lock. It sets the flag 85 in each structure 83 in a lock 80 to indicate that a writing process has acquired the lock. The larger the CPU group size, however, the fewer the number of flags that must be set. If there are readers present at the time that p_common attempts to acquire the lock for a writer, the writer is put to sleep and then awaked once all readers have finished.

TABLE 2

1) Acquire the mutex lock to exclude readers in the process of read-acquisition.
2) For each CPU group data structure of the lock, do the following:
   a) Atomically set the WRITER_LOCKING bit in the flag.
   b) Attempt to atomically compare-and-exchange both the WRITER_LOCKING and the WRITER_LOCKED bits, comparing with the WRITER_LOCKING for the old value. This operation will fail if there are any readers holding the reader-writer lock that used this CPU-group counter for their acquisition. If it fails, increment the reader_cpus_active counter.
3) If the reader_cpus_active counter is non-zero, there are readers. Atomically acquire the writer_await semaphore (sleeping at the priority specified by pri) and release the mutex. The last reader to read-release will wake up this writer.
4) Otherwise, if the reader_cpus_active counter is zero, there are no readers. Release the mutex.

The p_writer Primitive

The p_writer primitive acquires the specified reader-writer lock for a writer by first acquiring a global mutual exclusion lock (readers_writers_mutex) that limits write-acquisition to one writer. It calls p_common, if necessary, to change the flags 85 in the associated structures 83. This is not always necessary. If one writer follows another, then the lock may be acquired by the second writer without the first writer clearing the flags. This avoids a need to clear the flags to indicate that the first writing process has released the lock and then to set the flags to indicate that the second writing process has write-acquired the lock. The first writer becomes aware that a second writer is waiting through the v_writer primitive (described below) and leaves the flags set in the structures 83. The second writer becomes aware that the flags are left set by checking an indicator such as the flag 85 in the structure 83 on the node of the processor running the writing process.

TABLE 3

1) Acquire the readers_writers_mutex semaphore. This semaphore admits only one writer or one exclusive reader at a time.
2) Increment the readers_writers_active counter.
3) If the process has been killed and the flag is set:
   a) If already granted the lock, but not in write mode:
      i) Decrement the _readers_writers_active counter.
      ii) Release the _readers_writers_mutex semaphore to allow the next write- or exclusive-read-acquirer to proceed.
      iii) Return FALSE to indicate that write-acquisition did not occur.
   b) Otherwise, the lock has been granted in write mode from the preceding write-holder, and v_writer is invoked to release it and then return FALSE to indicate that acquisition did not occur.
4) If the lock was granted in write mode by the preceding write-holder, return TRUE to indicate that the lock was acquired.
5) Otherwise, write-acquire the lock by invoking p_common.

The v_writer Primitive

The v_writer primitive is called to write-release a lock by clearing the flags in each structure 83 within the lock 80. This clearing of the flags, however, is not always necessary. The flags are not cleared if it is determined that the next process in the queue to acquire readers_writers_mutex is a writer. This determination is made by checking an indicator such as a combination of the readers_queued field (which indicates that an exclusive reader is queued) and the readers_writers_mutex (which indicates if writers or exclusive readers are queued). Other indicators such as a single field, of course, can be used. Whether the flags are cleared or left set for a following writer, the primitive decrements the readers_writer_active counter to note the write-release.

TABLE 4

1) Acquire mutex.
2) If there is at least one exclusive reader queued (readers_queued not equal zero) or there are neither writers nor exclusive readers queued, or if the process has been killed, release the write-side lock as follows.
   a) For each CPU group, atomically subtract out both the WRITER_LOCKING and the WRITER_LOCKED bits.
   b) If there are processes waiting to read-acquire, wake them up.
3) Release mutex.
4) Decrement the readers_writers_active counter to note the write-release.
5) Release the readers_writers_mutex semaphore that was acquired in p_writer.

The p_exreader Primitive

The p_exreader primitive exclusively read-acquires a specified lock. An exclusive read can be used to enable a process to add something to a shared object without changing its present contents.

TABLE 5

1) Acquire mutex.
2) Atomically increment the number of exclusive readers queued (readers_queued). This forces any ongoing v_writer to completely release the lock.
3) Acquire the readers_writers_mutex semaphore (while atomically releasing mutex), decrement the readers_queued counter, and awaken all blocked read-acquirers blocked on the readers_await semaphore.
4) If the process has been killed and testterm is set:
   a) Decrement the readers_writers_active counter.
   b) Release the readers_writers_mutex semaphore to allow the next exclusive reader or writer to proceed.
   c) Return FALSE to indicate that the lock was not acquired.
5) Return TRUE to indicate that the lock was acquired.

The v_exreader Primitive
The v_exreader primitive exclusively read-releases a specified

TABLE 6

1) Decrement the readers_writers_active counter.
2) Release the readers_writers_mutex semaphore to allow the next exclusive reader or writer to proceed.

The u_exreader2writer Primitive
The u_exreader2writer primitive upgrades an exclusive-read-acquired lock to a write-acquired lock.

TABLE 7

1. Invoke p_common to acquire the lock in write mode.

The p_reader Primitive
The p_reader Primitive read-acquires a specified lock.

TABLE 8

1) Repeat the following steps indefinitely. Normally, only one trip will be taken through this loop, but races with write-acquiring processes could result in many trips.
   a) Get the CPU group of the per-CPU-group counter corresponding to the CPU that we are currently running on, place it in the local variable "enggrp", and record it in a per-process/thread location so that v_reader can determine which counter it is to use. Note that an alternative implementation would return the pointer to the caller, who would then be responsible for passing it in to v_reader.
   b) Atomically increment the per-CPU-group counter indicated by "enggrp". If the result is positive, we have successfully read-acquired the reader-writer lock, so return to the caller. Otherwise, a writing thread holds the reader-writer lock, so continue executing the following steps.
   c) Acquire the mutex.
   d) Atomically subtract one from the per-CPU-group counter indicated by "enggrp". If the resulting value had the WRITER_LOCKING bit set, and if we were the only thread attempting to read-acquire, we must resolve a race where both the writer and we detect each other's presence:
      i) Atomically compare-and-exchange the per-CPU-group counter indicated by "enggrp", using WRITER_LOCKING as the old value and WRITER_LOCKING|WRITER_LOCKED as the new value.
      ii) if the compare-and-exchange operation succeeds, the writer is waiting for us to complete, so decrement reader_cpus_active counter, and, if the result is zero, signal the writer_await semaphore, allowing the writing process to proceed.
   e) If the WRITER_LOCKING bit is set in the per-CPU-group counter indicated by "enggrp", atomically release mutex lock and sleep on the readers_await semaphore at priority "pri".
   f) Otherwise, simply release the mutex lock.
2) Since the loop repeats indefinitely, this step is never reached.

The v_reader Primitive
The v_reader primitive read-releases a specified lock.

TABLE 9

1) Retrieve the index of the counter saved by p_reader, placing it in a local variable "enggrp".
2) Atomically subtract 1 from the counter indicated by "enggrp". If the result indicates that a writer is attempting to acquire the lock and this is the last reader to have acquired on this counter, attempt to awaken the writer using the following steps:
   a) Acquire the mutex lock.
   b) Atomically compare and exchange the counter indicated by "enggrp," using old value locking and new value WRITER_LOCKING|WRITER_LOCKED.
   c) If the atomic compare-and-exchange operation succeeds, decrement the reader_cpus_active counter, and, if the result is zero, signal the writer_await semaphore to awaken the writer.
   d) In either case, release the mutex lock.
3) Return.

Having illustrated and described the principles of the invention in exemplary embodiments, it should be apparent to those skilled in the art that the illustrative embodiments can be modified in arrangement and detail without departing from such principles. For example, the invention may be used in other locking systems and for purposes for other than locking, such as providing related synchronization services. As noted, many other well-known mechanisms may be substituted for typical processes, such as threads, tasks, light-weight processes, and jobs, and the term "process" should be interpreted to cover such mechanisms and their equivalents. The data structures can be implemented in a variety of ways. For example, other lock structures can be used where the counter is not necessary to the invention. The functions of the described primitives may be combined or redistributed. Many of the software aspects of the embodiments may be implemented in hardware and many of the hardware aspects may be implemented in software. The steps of the various primitives can be carried out in different orders that still perform the same way and achieve the same results. And, as pointed out above, the invention is not limited to multiprocessor systems having a NUMA architecture.

In view of the many possible embodiments to which the principles of the invention may be applied, it should be understood that the illustrative embodiment is intended to teach these principles and is not intended to be a limitation on the scope of the invention. We therefore claim as our invention all that comes within the scope and spirit of the following claims and their equivalents.

We claim:

1. A reader-writer lock for a multiprocessor system comprising:

a first counter shared by a first group of two or more processors, the counter adapted to indicate whether a process running on a processor in the first processor group has read-acquired the lock;

a first flag associated with the first counter, the flag adapted to indicate whether a process running on a processor in the multiprocessor system has write-acquired the lock;

a second counter shared by a second group of one or more processors, the second counter adapted to indicate whether a process running on a processor in the second processor group has read-acquired the lock; and a second flag associated with the second counter, the second flag adapted to indicate whether a process running on a processor in the multiprocessor system has write-acquired the lock.

2. The reader-writer lock of claim 1, wherein the multiprocessor system includes interconnected processor nodes, a first node including the first processor group and local memory storing the first counter and first flag, and a second node including the second processor group and local memory storing the second counter and the second flag.

3. The reader-writer lock of claim 2, wherein a line of local memory on a node is sized to contain counters and associated flags that are parts of multiple reader-writer locks for the processor group on the node.

4. The reader-writer lock of claim 2, further comprising at least two groups of processors on each node, each processor group sharing a separate counter and associated flag.

5. The reader-writer lock of claim 4, wherein the counter and associated flag for a first processor group on the node are stored in a first line of memory and the counter and associated flag for a second processor group on the node are stored in a second line of memory.

6. The reader-writer lock of claim 1, further comprising an identifier adapted to indicate the processor group that contains the processor on which a process was running at the time the process acquired the lock.

7. The reader-writer lock of claim 1, further comprising a mutual exclusion lock adapted to indicate to other processes desiring to acquire the reader-writer lock that a process has write-acquired the reader-writer lock.

8. The reader-writer lock of claim 1, further comprising a mutual exclusion lock adapted to indicate to other processes desiring to acquire the reader-writer lock that a process is write-acquiring the reader-writer lock.

9. The reader-writer lock of claim 1, further comprising an indicator adapted to indicate to a first writing process before it releases the lock that a second writing process desires to acquire the lock,
thereby avoiding a need to clear said flags to indicate that the first writing process has released the lock.

10. The reader-writer lock of claim 1, further comprising an indicator adapted to indicate to a second writing process before it acquires the lock that a first writing process has most recently held the lock,
thereby avoiding a need to set said flags to indicate that the second writing process has write-acquired the lock.

11. The reader-writer lock of claim 1, further comprising a termination flag adapted to indicate whether the each process acquiring the lock is active.

12. The reader-writer lock of claim 1, further comprising including an identifier adapted to identify whether the lock is held by an exclusive-reading process.

13. The reader-writer lock of claim 1, wherein the first counter and first flag are combined in a word.

14. The reader-writer lock of claim 1, wherein the multiprocessor system includes interconnected processor nodes, wherein a quantity of processors per node is variable.

15. A reader-writer lock for a multiprocessor system comprising:
a lock structure shared by a group of one or more processors, the structure adapted to indicate whether a process running on a processor in the processor group has read-acquired the lock;
a flag associated with the lock structure, the flag adapted to indicate whether a process running on a processor in the multiprocessor system has write-acquired the lock; and
an indicator adapted to indicate to a first writing process before it releases the lock that a second writing process desires to acquire the lock,
thereby avoiding a need to clear the flag to indicate that the first writing process has released the lock.

16. The reader-writer lock of claim 15, further comprising an indicator adapted to indicate to a second writing process before it acquires the lock that a first writing process has most recently held the lock,
thereby avoiding a need to set the flag to indicate that the second writing process has write-acquired the lock.

17. The reader-writer lock of claim 15, wherein the lock structure comprises a counter and an associated flag.

18. A reader-writer lock for a multiprocessor system comprising:
a first counter shared by a first group of one or more processors, the counter adapted to indicate whether a process running on a processor in the first processor group has read-acquired the lock;
a first flag associated with the first counter, the flag adapted to indicate whether a process running on a processor in the multiprocessor system has write-acquired the lock;
a second counter shared by a second group of one or more processors, the second counter adapted to indicate whether a process running on a processor in the second processor group has read-acquired the lock;
a second flag associated with the second counter, the second flag adapted to indicate whether a process running on a processor in the multiprocessor system has write-acquired the lock; and
an identifier adapted to indicate the processor group that contains the processor On which a process was running at the time the process acquired the lock.

19. The reader-writer lock of claim 18, wherein a process running on a processor in the first processor group read-acquires the lock by changing the first counter.

20. The reader-writer lock of claim 18, wherein a process running on a processor in the first processor group write-acquires the lock by changing the first and second flags associated with the first and second counters.

21. A method of write-acquiring a reader-writer lock in a multiprocessor comprising:
providing a first counter shared by a first group of two or more processors and a second counter shared by a second group of two or more processors;
indicating through a count of waiting writers to a first writing process before it releases the lock that a second writing process desires to acquire the lock;
maintaining the status of an indicator to indicate that a process has write-acquired the lock; and
releasing the lock to the second writing process,
thereby avoiding a need to clear the flag indicator to indicate that the first writing process has released the lock.

22. The method of claim 21, further comprising
avoiding setting of a flat to indicate that the second writing process has write-acquired the lock by indicating to the second writing process before it acquires the lock that a first writing process has most recently held the lock;
wherein said flag is associated with the counter and is adapted to indicate whether a process running on a processor in the multiprocessor system has write acquired the lock.

23. A method of upgrading an exclusive-reading process to a writing process, comprising:

providing a first counter shared by a first group of one or more processors, the counter adapted to indicate whether a process running on a processor in the first processor group has read-acquired the lock;

providing a first flag associated with the first counter, the flag adapted to indicate whether a process running on a processor in the multiprocessor system has write-acquired the lock;

providing a second counter shared by a second group of one or more processors, the second counter adapted to indicate whether a process running on a processor in the second processor group has read-acquired the lock;

providing a second flag associated with the second counter, the second flag adapted to indicate whether a process running on a processor in the multiprocessor system has write acquired the lock;

exclusive-read acquiring a lock; and write-acquiring the lock.

* * * * *

UNITED STATES PATENT AND TRADEMARK OFFICE
CERTIFICATE OF CORRECTION

PATENT NO. : 6,823,511 B1
DATED : November 23, 2004
INVENTOR(S) : McKenney et al.

It is certified that error appears in the above-identified patent and that said Letters Patent is hereby corrected as shown below:

Column 13,
Line 47, should read as follows: -- a termination flag adapted to indicate whether each --

Column 14,
Line 31, should read as follows: -- contains the processor on which a process was running --
Line 52, should read as follows: -- thereby avoiding a need to clear the indicator to --
Line 56, should read as follows: -- avoiding setting of a flag to indicate that the second --

Signed and Sealed this

Fifteenth Day of March, 2005

JON W. DUDAS
*Director of the United States Patent and Trademark Office*